Feb. 24, 1970      A. A. HIRSCH      3,497,068

BLENDED GRANULAR BEDS FOR WATER AND WASTEWATER FILTERS

Filed Dec. 21, 1967      2 Sheets-Sheet 1

A. Adler Hirsch

INVENTOR.

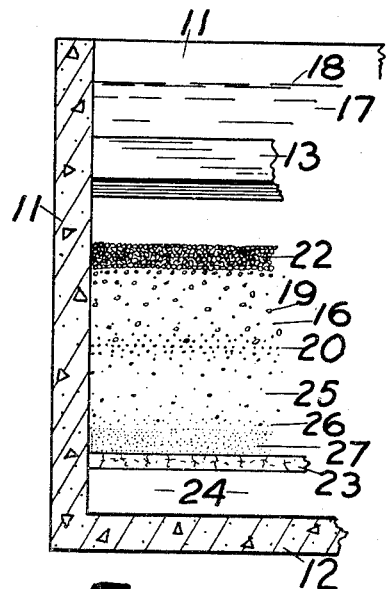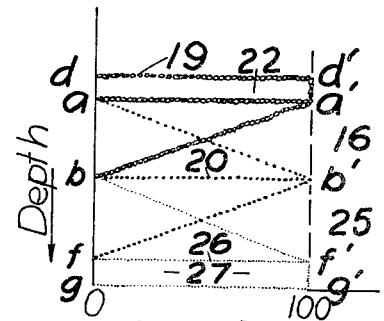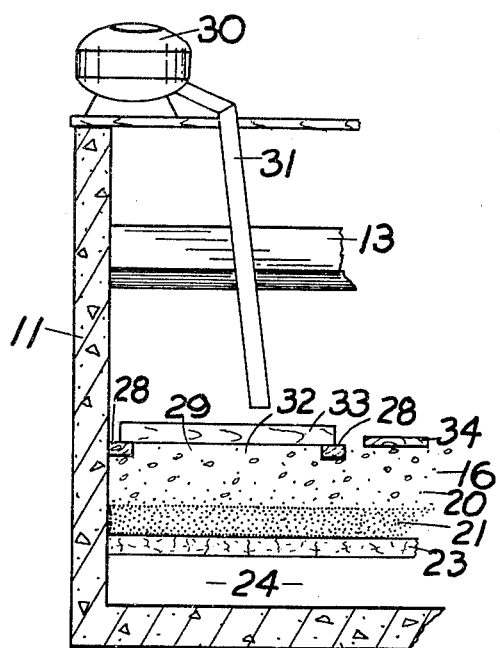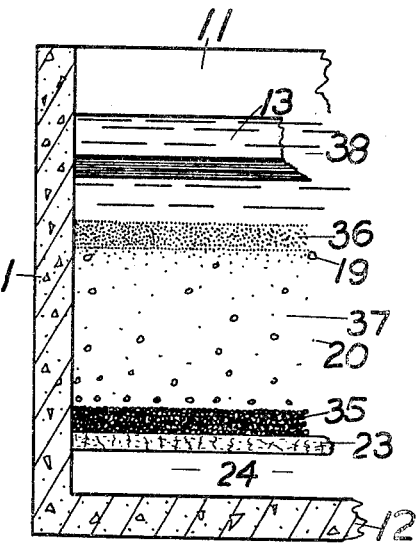

United States Patent Office 3,497,068
Patented Feb. 24, 1970

3,497,068
BLENDED GRANULAR BEDS FOR WATER
AND WASTE WATER FILTERS
A. Adler Hirsch, 141 Norwood St.,
Shreveport, La. 71105
Filed Dec. 21, 1967, Ser. No. 692,431
Int. Cl. B01d 23/10
U.S. Cl. 210—275                                14 Claims

ABSTRACT OF THE DISCLOSURE

Fine and coarse granular material is blended before placement and laid in shallow laminae in downflow filters so that average grain, hence pore size, varies continuously, decreasing with depth. Hydrodynamic stability is established by using materials having equal degrees of expansion at the upflow rate intended. A homogeneous roughing layer of the larger component may overlay the graded blend; a final polishing layer consisting of the finer component may be on the bottom. For particular needs, more than one such blended zone may be formed with additional materials. In upflow filters grading order is reversed. No interfaces exist between zones.

---

Figure 1:
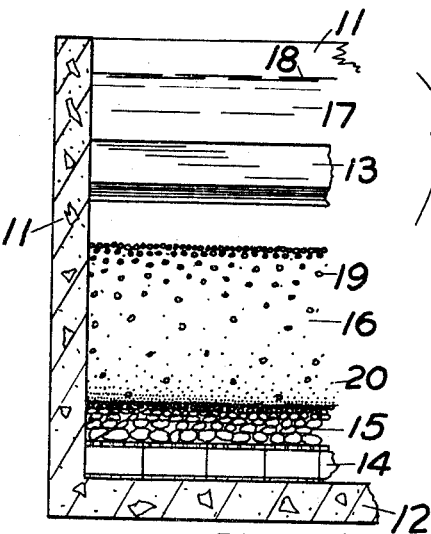

My invention relates to the structure and installation of granular beds in so-called rapid sand filters as used for filtration of water and wastewater.

The step of filtration through a granular bed is an essential part in the reliable preparation of a safe, potable water supply when derived from surface sources. A rapid sand filter, as popularly used today, consists of a bed of sand grains, from 20 to 30 inches thick, effective size usually ranging from 0.4 to 0.8 mm. and uniformity coefficient from 1.2 to 1.7. Larger effective size permits turbidity to pass through, and smaller effective size, while producing clear effluent, does so with a faster build up of loss of head and a shorter filter run. Too low a value of the uniformity coefficient signifies that the distribution of grain sizing approaches uniformity and hence reduces the chances for lodgment of suspended particles once they have passed the top layers; too high a uniformity coefficient means many of the smaller grains are enclosed loosely within voids between larger grains and hence do not contribute efficiently toward removal of suspensates. A large value of uniformity coefficient also denotes a sand that will stratify markedly during backwash with the fines moving to the top of the bed. Such an arrangement catches both large and small floc within the smallest voids and thus clogs the bed quickly.

Since any inert granular material can perform as a filter medium, other substances have competed with sand or have been chosen for special purposes. Being available in quantity as a by-product of coal mining, anthracite particles are widely used in filter beds. A popular trade designation is the name Anthrafilt. Having a lower specific gravity than sand, namely 1.5 as compared to 2.6, respectively, Anthrafilt suspends more readily during a backwash, and hence lower upflow velocities suffice for equal sized grains.

During backwash the rising currents through a sand bed effect a hydraulic classification of its various component sizes, the smaller grains being swept toward the top. Now the top of the bed is the first area of contact of the influent liquid and its suspended particles. Meeting the smaller grains, the solids in suspension, both large, small and intermediate in size become entrapped there building up within a thin layer hydraulic resistance to the passage of liquid. Liquid then flows through lower levels of the filter bed with relatively little benefit to quality, but still adding a small amount to the loss of head accumulated in the clogging top layer.

While it would be desirable to reverse the positions of the variously sized sand grains with respect to altitude in a filter bed so that the top sections would present the largest grains and pores, and thus act as a roughing filter, the dynamic floatation during backwash precludes such an arrangement. For a bed consisting of a single material, the lighter, smaller grains will always wash to the top of the bed.

In order to present a reverse order of grain sizing, namely large grains or pores at the top and small ones at the bottom, a dual media filter bed was conceived in the 1930's. With this arrangement the top, coarser portion acts as a roughing section or prefilter for the finer, bottom layer which finishes the straining process, but with less impingment of suspensate, therefore, a reduced rate of clogging. Conventional size sand grains, effective size 0.5 mm. and uniformity coefficient 1.5, commonly form the bottom layer and anthracite granules, effective size 1.0 mm. and roughly the same uniformity coefficient is the top layer. To permit as much roughing action as possible, the thickness of the anthracite section is about three times that of the sand layer, 18 inches of Anthrafilt over 6 inches of sand being a frequent combination. In such cases the Anthrafilt is large enough not to be carried away by backwash, but small enough to possess sufficient floatation to remain in stable position above the sand.

Such filters give noticeably longer runs than do the all-sand beds and use less washwater during cleaning. However, due to the reduction in sand bed thickness they are more sensitive to lapses in quality of the preparative coagulation and settling stages, permit breakthrough toward the end of a run and are prone to deliver slugs of depreciated quality effluent when subject to even slight hydraulic surges.

Dual bed filters perform during the filtration phase as two separate filters, one bed superimposed over the other. Thus a dual bed filter does not filter throughout its depth as a continuous unit. This was demonstrated in applicant's article "Backwashing Investigation and a Proposed Simple Uniformity Control," Journal of the American Water Works Association vol. 60, No. 5, pp. 570–585 (May 1968). Backwash catchment curves, plotted in FIGURE 10, showed a characteristic cusping on their descending arc. If the filter removed floc consistently throughout its full depth, this portion of the curve would be continuous, without breaks.

For the purpose of establishing immunity to surging in a reversedly-graded filter, the next step in the sophistication of the bed consisted in supplying a third heavy and even finer material to underlie the sand layer. The last step in the current art was to intermix the three materials during backwash. For the third fine, heavy material magnesite, and more recently, garnet have been used. Garnet has an effective size of 0.15 mm. and specific gravity of 4.2. In such a mixed-media bed there is a variation in sizes, with smaller pores predominating toward the bottom, and the large pores still performing as a prefilter toward the top, but with at least a show of all materials at all levels.

Such a bed does not allow so long a filter run, or show so small an initial loss of head, nor exhibit the economy of wash water as does the separate layer dual media type but it does perform with greater reliability, better effluent clarity and safer sanitary protection.

This recount, as related above, is the contemporary state of the art in the structure of filter beds.

EFFECT OF WASH WATER TROUGHS

Into this picture must now be introduced an important, heretofore unrecognized experimental fact disclosed by applicant's research into phenomena accompanying backwash. A. Adler Hirsch, "Filter Backwashing Tests and Upflow Equalization," Journal of the Sanitary Engineering Division, American Society of Civil Engineers, vol. 94, SA 1:129 (February 1968). All filters, constructed with wash water troughs or other draw off devices, are subject to a high degree of short circuiting in the vicinity of the troughs at the expense of upflow in the middle portions of the bay between troughs, and at walls and corners. With some portions of the bed thus overwashed and much of the bed underwashed, there will be a consequent difference in the relative amounts of garnet, sand and anthrafilt underlying each location over the whole surface of the bed. This in turn will result in differences in filtration performance, measured by any pertinent value, from one spot to another. Filtration will be over-rate immediately under the sides of the troughs and grossly under-rate at the median between troughs, the walls and the corners. This disparity in filtration rate will continue throughout the whole length of run; evidence developed during the research referred to definitely indicated the absence of any self-healing or self-patching process. Thus a multiple media bed, mixed by backwash in a filter box having conventional troughs, has the serious fault of variation in composition from point to point. The most vulnerable spot will govern the quality of the effluent.

This fault, by itself, if there were no other, is correctible by installation of a means to prevent short-circuiting. Such a device is described in applicant's patent U.S. 3,313,420, Apr. 11, 1967, "Perforated Equalization Baffles for Backwashing Rapid Sand Filters and Parallel Applications." With achievement of uniform upflow, stripping of entrapped suspensate during backwash becomes evenly distributed and the filter performs uniformly over the whole surficial area. However, there are more fundamental faults to mixed media beds as presently used.

FUNDAMENTAL DEFECTS IN MIXING MEDIA BY BACKWASH

First, and basically most important, is the fact that previously described mixed media bed are all hydraulically mixed by the act of backwashing. This method sorts or positions the various grains according to the resultant of forces composed of their submerged specific gravities and the upward drags of the vertically upward current. This drag varies as a complex function of their size, shape and gradation. Actually what is desired in a filter bed is a grading simply according to the first power of the size only, since this determines the dimensions of the pore spaces which catch the suspended matter. It is wholly immaterial to the suspensates what the specific gravity of the straining medium is. A hydraulically classified bed, therefore, is actually a jumble of grain sizes and specific gravities, hence can never be an ideal filter.

The first object of this invention, then, is to describe the structure of a hydrodynamically stable blended media filter bed which avoids the need for hydraulic mixing of the various component materials after installation.

A further object of this invention is to provide a reversedly size graded filter bed consisting of two or more materials in which grain size, hence pore size, at any depth is independent of the specific gravity or shape of the respective materials, but is placed in position initially and permanently only in accordance with grain size, the largest grains being at the top of the bed, and the average size of the blend, at any horizontal stratum within the bed, decreasing unidirectionally with depth.

A second fault of present hydraulically intermingled mixed media beds arises from the fact that the upward wash water current carries each of the differently sized particles completely throughout the depth of the bed. There will be some of the smallest grains of heaviest material swept to the top of the bed, while some of the largest light grains settle to the bottom. This, in effect, to the extent occurred, negates the reverse grading principle. The top portions of small granules act to arrest floc penetration there, thus reducing floc storage capacity before necessity of backwashing; and the large grains near the bottom serve no useful or functional purpose, and even reduce surge immunity.

Just as catchment tests of backwashings show the separate sectional retention of floc in a separate dual media filter bed, this type of test reveals the discontinuous removal of floc in a hydraulically mixed media filter bed also. Here the cusps in the backwash suspended solids curves are not so prominent as with separate dual media beds, but a slight break in the graph exists for each separate material.

Another object of this invention is to devise a filter bed in which grossly divergent grain sizes do not migrate the full depth of the bed but are restrained to altitudes in the bed as initially placed.

From the foregoing discussion the need becomes plainly evident for a clear conception of the functional significance of each part of a bed and their synthesis into an integral, rational septum.

As a start, the ideal bed should incorporate some of the logic behind the separate layer dual media filter. A top, large grained, uncluttered layer should be provided to serve as the roughing section; similarly, there should be a small grained portion, at the bottom, free from volumetric wastage by large grains, to be the final backstop against breakthrough and to stabilize the filter against hydraulic jars. Up to this point the bed is a conventional dual media type.

Now a basic fault of the dual media discrete layer bed is the existence of a relatively sharp interface between the top Anthrafilt and the bottom sand layers. Most of the trappable material escaping the Anthrafilt will be caught and concentrated near the top of the sand, just as in the case of a complete sand bed. At the same time, considerable Anthrafilt voids will remain unoccupied by floc and hence not contribute to the length of a filter run. Clearly then, the sharp division between large Anthrafilt on top and small sand on the bottom must be eliminated, and replaced by a mingled zone containing a systematic gradation of the pair of materials. This zone should contain varying proportions of each material, dependent upon altitude within the zone. This proportion should be dependent only on the first power of grain size and not be affected by other variables as in the mixed media bed. To be size dependent only, this combination zone must be blended deliberately as a separate operation during installation in the filter box and be stable against the disarranging effects of backwashing. This feature is in direct contrast to the reliance on backwashing for mixing of previous mixed media beds.

BLENDED ZONE BED

It is an object of this invention to describe a rational granular bed filter, having a top roughing section, a bottom fine straining section and an intermediate or transition layer composed of varying proportions of the top and bottom materials, each section being placed and the intermediate layer being blended as a deliberate act during preparation of the filter.

It is a further object of this invention to proportion the two materials in the intermediate layer so that the largest pores are at the top, the smallest pores at its bottom, and the intervening pores varying in average size so that they become smaller with respect to depth within this section.

If the sand is too large relative to the Anthrafilt it will stratify to the bottom; if it is too small it will rise toward the top of the intermediate zone, and perhaps the surface of the bed. Such a filter to be permanent in composition must possess inherent stability against shifting of the grain size distribution during backwash. This characteristic is obtained by observing a proper relationship between specific gravity and drag force at the desired backwash rate for the two materials.

It is therefore, additionally, an object of this invention to select cooperative or corresponding sizes of granular materials within a blended media filter bed to retain a steady state of kinetic equilibrium during the backwashing phase.

As a practical observation, increasing the rate of backwash tends to raise the smaller grains to the surface of the bed. Hence, stability at one rate does not signify the same property at a higher rate, except to an extent permitted by hindered floatation. However, this effect should be regarded as a factor of safety, rather than be included in the determination of fluidically equivalent grain sizes. As previously stated, stability against alteration of grain size distribution within the transition zone during backwash is obtained by proper balance between specific gravities and drag forces of the respective components. As a working rule, granular materials will remain in stable fluidized equilibrium provided their degree of expansion is the same at the backwash rate selected for operation. Their distribution will remain stable also at lower rates, but may deviate at higher rates of upflow.

Floatatable stable sizes and materials in prepared blends obviate the necessity for high backwash rates to effect and to maintain a distribution of grain sizes. Thus, an optimum backwash rate to give longest succeeding filter runs can be used routinely. Experiments reported with 0.64 mm. effective size and filters has shown that 16.7 gallons per minute per square foot is the optimum upflow rate, and that higher or lower backwash rates for this material are less productive. (Robert L. Johnson and John L. Cleasby, "Effect of Backwash on Filter Effluent Quality," Journal of the Sanitary Engineering Division, Proceedings of the American Society of Civil Engineers, 92, Separate No. SA 1, Proc. Paper 4692, p. 215, February 1966.)

Hence, it is an object of this invention to provide a filter bed of blended composition which will permit use of reasonably low backwash rates.

Actually, the rate of backwash varies over the surface of a filter due to the short-circuiting influence of the wash troughs, as previously mentioned. Hence the influence of hindered floatation is relied on to preserve constant percentage distribution of materials in vertical profiles across the area of the bed.

As a point of observation granular materials which are floatatably equivalent may be used in either blended beds or in separate layer dual media filters without disarrangement during backwash. However, the converse is definitely not true. Thus, because two different materials perform satisfactorily in a separate dual media filter, they do not necessarily fulfill the requirements for hydraulic stability in a blended media bed. Their separate existence in layers may even be due to unequal uplift, the top layer being the more buoyant.

So far in this discussion, the ideal bed consists of a top uni-media large grained roughing section, a bottom uni-media small grained final catchment and surge resistant section, and a tapering composition intermediate zone of both materials which in its upper reaches adds to the roughing action and in its lower levels supplements the final catchment and shock resistance function. The thickness of the three zones remains to be approximately established.

Accordingly, another object of this invention is to indicate the approximate thicknesses of the three zones, as previously identified, within a filter bed.

Loss of head profiles down a dual bed show in the coal layer diminishing rates of increase in head loss per unit depth; after about 8 inches depth there is no appreciable further loss of head in the coal topping. (Thomas R. Camp, "Discussion" of Walter R. Conley, "Experience With Anthracite-Sand Filters," Journal of the American Water Works Association 53, p. 1478 (December 1961).) Therefore, presence of anthracite below this depth is unproductive and represents a waste of material and preemption of bed space. This measurement, then, should be a logical maximum depth for the large-grained topping of the bed. Practically, a thickness of 6 inches is preferred in applicant's construction, since the top portion of the transition zone is largely anthracite.

For the thickness of the bottom sand layer or base the current practice in dual layer beds of adopting 6 inches thickness is ample to effect acceptable final clarity. More sand would only add greater initial loss of head, since floc entrapped here is chiefly in the top 2 inches. Less thickness of sand would be difficult to handle accurately, especially over a gravel course.

Presence of a bottom layer, such as finer grained sand, is also helpful as a telltale to determine the presence and location of blow holes or boils in the upflow. If such defects appear and are repaired in advance of further construction disarrangements within the dual material transition zone can be avoided.

Since the total depth of filter beds range from 24 to 30 inches, and 12 inches has been assigned to the single components in top and bottom layers, respectively, the thickness of the transition zone, containing a depth-graded blend of both materials, will vary from 12 to 18 inches.

Since there can never be the most efficient gradation in grain, or pore size, by action of backwash, placement of the bed materials must be done during installation of the filter.

An object of this invention, which then follows, is to explain method or procedure by which a bed consisting of a fine base layer, a coarse topping and intermediate strata consisting of the two paired materials so arranged that pore size decreases with depth can be installed.

This object is attained by placing the top and bottom layers separately as in conventional filters, but installing the intermediate transition zone, previously blended in proportions according to depth, in small vertical increments.

Figure 2:
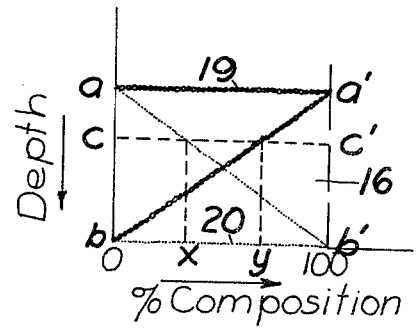
Figure 3:
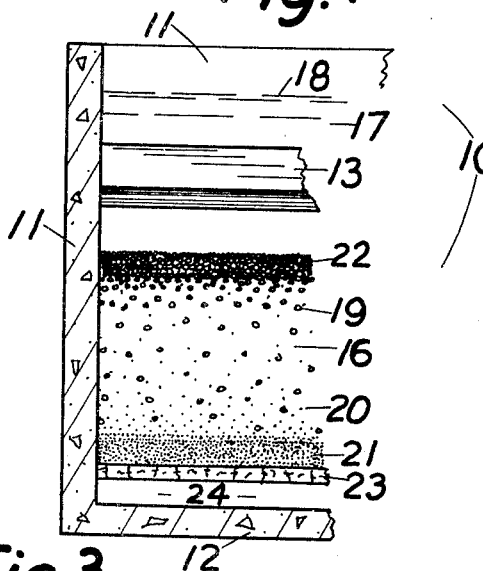
Figure 4:
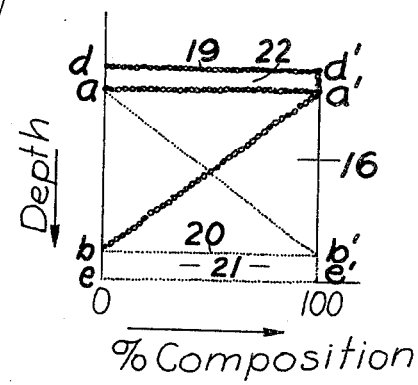
Figure 5:
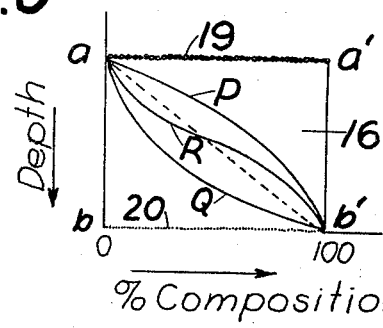

Details of the bed and its placement will be evident from the drawing in which:

FIGURE 1 is a partial cross section of a filter box containing two media blended as a composite transition layer, FIGURE 2 is a graph showing the variation in composition with depth for the filter bed of FIGURE 1, FIGURE 3 is a partial cross section of a filter box containing a bed composed of coarse media on top, fine media on the bottom and an intermediate transition zone containing a planned gradation of both materials, FIGURE 4 is a graph showing the variation in composition with depth for the filter bed of FIGURE 3, FIGURE 5 is a graph to indicate several of the various possible variations of media distribution with depth within a filter bed bi-media transition zone, FIGURE 6 is a partial cross section of a filter box showing a bed composed of three materials and two blended bi-granular intermediate layers, FIGURE 7 is a graph which indicates the variation in composition with depth for the filter bed of FIGURE 6, FIGURE 8 is a partial cross section of a filter box and bed during the course of construction to explain a method for placement of the blended materials in the transition zone, and FIGURE 9 is a partial cross section of an upflow filter box containing a bed composed of fine media on the top, coarse media on the bottom and intermediate transition zone composed of a planned gradation of both materials.

Referring to the separate figures:

In FIGURE 1, filter box 10, consisting of containing walls 11 and floor 12, has wash water troughs 13 mounted therein. It is fitted with suitable connections and valving, not shown. Installed therein are underdrains 14, a supporting gravel layer 15 and a blended dual media, or bi-media, bed 16. Applied water 17 stands above the bed 16 and troughs 13 with its level at 18. Filtrate passes through bed 16, gravel layer 15, then enters underdrains 14 and leaves the filter box through an effluent pipe (not shown). Backwash, on the other hand, enters the filter bed through the underdrains and flows upward through the gravel, thence the bed 16 and overflows the trough 13 to waste.

Blended media bed 16 consists of a combination of a large grained, relatively light material, such as anthracite particles, trade name Anthrafilt, 19 and a small grained relatively heavy material, such as filter sand, 20. These separate materials are selected in sizes to be hydrodynamically identical in backwash response. Hence, any combination of the two will shift without differential separation when washing the bed.

Distribution of the coarse and the fine components within bi-media bed 16 varies continuously from 100% coarse material at the top to 0% thereof at the bottom; complementarily, the fine component varies continuously from 0% at the top to 100% at the bottom.

The diagram, FIGURE 2, illustrates this mode of variation graphically. Depth is marked vertically downward along the vertical axis and percent composition is spaced along the horizontal axis. The top surface of the bed is represented at $aa'$; only coarse granular material is at this level. At the bottom, $bb'$, overlying the gravel, only fine grains are present. The total thickness of the blended bed is $ab$ or $a'b'$.

The variation in amounts of the two bed materials at intermediate levels is here indicated, for simplicity, as a linear function of the depth within the bed, along diagonals $a'b$ for coarse material and along $ab'$ for fine material. The corresponding percentages of each material at some point or horizontal stratum $c$ within the bed is determined by the intersection of a horizontal line $cc'$, drawn through point $c$, with the diagonals. The intersection of $cc'$ with $ab'$, projected to the horizontal axis at $x$ indicates the percent by volume of fine material. The corresponding volumetric percentage of coarse material is $100-x$; or it may be obtained in analagous manner from the intersection of line $cc'$ with diagonal $a'b$ produced to point $y$ on the horizontal axis.

While the law of variation has been indicated above as linear, any system of curvature along the path $ab$ may be adopted where conditions warrant.

FIGURE 3 shows a three section filter bed consisting of a blended bi-media zone 16, as before, but sandwiched between a bottom layer 21 of fine component and a topping 22 of coarse component. In this filter box the media rests on a porous plate bottom 23. Filtrate collects in the plenum space 24 from whence it is drawn off. The porous plate bottom is advantageous both in elimination of the gravel and in conserving head room that can be devoted to additional thickness of the septum if desired.

Topping section or cover layer 22 is a relatively thin roughing bed for removal of coarse floc or large suspended solids from the filter influent. This initial straining action prolongs the operating cycle of the lower sections. Its thickness should be between 3 to 8 inches; a thinner layer loses floc storage capacity; a thicker bed fails to add toward removal of suspended matter. Effective size of anthracite topping for this usage is about 1.0 mm. with a porosity of about 50%.

Base polishing layer 21, the heavy fine grained component, usually silica sand should be about 0.4 to 0.5 mm. effective size and porosity about 42%. Thickness of this layer should be between 3 to 6 inches. A thinner layer is hardly practical and a thicker layer adds unnecessary loss of head and reduces room available for the intermediate bi-media layer. A greater thickness is unnecessary, also, in view of the structure of the transition layer 16.

FIGURE 4 is a graphical diagram illustrating the structure of the 3-compartment bed of FIGURE 3. The blended bi-media zone 16 is represented as in FIGURE 2 with its top and bottom indicated by lines $aa'$ and $bb'$, respectively. As before the composition within this composite layer 16 at any depth is determined by the same process as used in FIGURE 2.

Above the top of the blended zone 16 is the roughing section 22, its thickness is $da$. Lines $dd'$ and $aa'$ are parallel to the horizontal axis. Below the bottom of the bi-media blend 16 is the fine polishing layer 21. Its thickness is $be$. Line $bb'$ is parallel to the horizontal axis. Linear variation in composition of the blended transition layer 16 with depth is indicated here.

FIGURE 5 is a graph exhibiting various types of curvilinear relationships possible between composition of the blend and depth within the transition zone 16. Curve P represents a gradation wherein the finer medium 20 exceeds the proportions indicated by the diagonal $ab'$; curve Q represents a variation in which there is less finer medium at any depth than a diagonal type entails; and curve R is a compound type of blend in which the upper layers of composite zone 16 contain less fines than variation along the diagonal $ab'$ whereas its lower layers contain more such fines than in diagonal disposition. Average size of pores is governed by the average size of the composited media at any depth.

Selection of a particular curvature depends upon the expected demands on the filter. Curve P permits relatively more fine polishing action; curve Q promotes longer filter runs and greater floc storage, and curve R splits these functions between upper and lower halves of the layer. Diagonal $ab'$, as stated previously, is a simple compromise method of variation.

Previous modes of variation of grain size with depth described above have been unidirectionally continuous, however, a discontinuous variation is conceivable to meet certain infrequent, specialized requirements.

This diagram, and similar graphs, FIGURES 2, 4 and 7, show the continuous and orderly size-based variation in composition of the bi-media zone with depth and the complete absence of an abrupt interface such as characterizes separate bed dual media types. Furthermore the relative grain sizes of each component should be selected on the basis of experimental expansion tests in order to avoid vertical disarrangement during backwash. These sizes may also be estimated algebraically by means of formulae. (Textbook: Thomas R. Camp, in C. V. Davis, "Handbook of Applied Hydraulics," McGraw Hill Book Co. New York (1942), p. 815, equation 32).

Should there be unequal hydrodynamic uplift by vertical currents, the smaller grained component material, having higher specific gravity, should preferably be the one having the smaller amount of floatation, because if the bed slowly or inadvertently separates due to this disparity in relative expansion properties the bed will in effect "fail-safe" with the smaller grains gravitating to the bottom. The bed will then degenerate into a conventional reverse graded dual media filter. If, on the other hand, the large grains migrate to the bottom of the bed, the filter will become merely the equivalent of a shallow depth sand filter; the larger grains usually anthracite, underneath then accomplish no functional purpose whatever.

FIGURE 6 shows a triple-media four-zone filter bed consisting of a top roughing section 22 of coarse material, like anthracite, an upper blended zone 16 composed of anthracite and finer material like filter sand, as in the filter of FIGURE 3, a lower blended zone 25 composed of the fine component of the upper blended zone and a still fined material 26, like 0.15 mm. effective size garnet or magnesite, and a final bottom finishing layer 27, about 3 inches thick, composed of the finest component 26. Only the coarsest and the finest materials appear in both a blended and a homogeneous zone. Intermediate sized media is used in blends only. This principle of arrangement may be extended to any larger number of components. Also the top roughing section or the bottle finishing section, or both, may be omitted in some cases; but in general these discrete layers perform the singular functions of preliminary roughing and final polishing, respectively, as previously described, and in most cases the top layer, especially, should be retained, for interception of large particulates. Final polishing can still be accomplished in the lower reaches of the bottom blended zone 25. The filter box itself is similar to the unit described in FIGURE 3.

The graph, FIGURE 7, shows the granular types of media at various depths within the bed of the filter of FIGURE 6 and their relative proportions. As before, a diagonally linear type of varition of the pair of materials constituting a blended transition zone is assumed for simplicity. Conventions observed in the drawing are the same as in FIGURES 2 and 4. Line $dd'$ represents the top of the bed, line $aa'$ the bottom of the corse roughing portion and likewise the top of the upper transitional layer, line $bb'$ the bottom of the upper transition zone and likewise the top of the lower transition blend, line $ff'$ the bottom of the lower transition section and likewise the top of the homogeneous fine grained bottom finishing layer and line $gg'$ the bottom of this final layer.

In each of the blended zones, 16 and 25, respectively, the percentage of the coarser component is greater at the top and decreases to zero at the bottom. The amount of finer component varies in the reverse order. A given component does not appear in more than two successive layers. There is no abrupt interface.

The various materials are so sized as to have equal hydraulic uplift at the rate of backwash employed; they will then remain in stable attitudes as placed in the bed. Conversely, if these three materials were placed in superimposed layers in a separate homogeneous strata type triple media bed there would be no appreciable mixing across the interfaces.

FIGURE 8 shows a method for placement of an intermediate blended zone in a filter box, such as in FIGURE 3. Anthrafilt and filter sand are the materials used in the illustration. The bottom layer 21 of finer medium, sand, has already been spread to the proper level over porous plate bottom 23. A preliminary test wash has been admitted to assure freedom from boils or other irregular spots before proceeding further.

In order to place the transition blended layer 16 spacers, or gage boards, 28, such as 2" x 4" strips of lumber are laid over the previously leveled bed and the space 29 in-between them filled with appropriately blended media from mechanical blendor 30. After sufficient material has been dropped onto the bed through chutes 31, the incremntal layer 32 is leveled by drawing screed 33 across guide board spacing 28. After this space is filled across the filter, the guide boards are moved to the next location to be filled. The space left where a guide is lifted is filled with the same batch from the blendor, and similarly leveled across the previously installed areas. Disturbance of the bed structure is avoided by workmen walking over walkway board 34.

After an incremental layer has been applied over the whole filter the guide boards 28 are set in place for the next such layer above it. At the same time the proportions or separate components discharged from the blendor is changed to conform to the higher level in the bed.

For accuracy in controlling the thickness of the incremental layer, the materials should either be bone dry, or if moist, the bed should be slightly submerged to obtain free motion of the grains on screeding and proper leveling. Construction of the bed in this manner adds a small step-wise incremental thickness of certain composition to the blended zone instead of the theoretical continuous variation with depth, however this departure from academic perfection is insignificant in importance.

Up to this point descriptions have been from the viewpoint of traditional downflow filters, however, the principle of equi-expensive uplift at the selected backwash rate and the method of incremental placement of blended media in horizontal laminae may just as effectively be applied to the structure of upflow filters.

FIGURE 9 shows a partial section of an upflow filter. Structural features are similar to those in FIGURE 3, except that the filter bed is arranged reversedly, consisting of a coarse screening layer 35 at the bottom, a fine polishing layer 36 at the top and a transitional blended zone 37 intermediate the two. Influent flows upward from the plenum 24, ascends through the bed, meeting coarsest media first, then the blend 37 which gradates upwardly from coarse to fine grains, thence through the final fine topping 36. Filter effluent or filtrate 38 reaches only to the top of the troughs where it overflows and passes to the effluent piping (not shown). Backwashing is performed as in traditional downflow filters.

In applying the principles of this invention the previous directions have mentioned the most preferred methods, however, other materials may be used for filter media besides those specifically identified by name and other techniques for blending and placement of the bi-media transition zones may be employed within the scope of this disclosure. The number of different media has been described as two or three, but there is no limitation, other than practicality, on the actual number that may be used. In most water plants two different granular materials will suffice; three may be desirable under unusual conditions. A greater number is unlikely.

I claim:
1. A granular bed for filtration of liquids, a filter box therefor, said bed consisting of at least two different component materials, a means for upwardly backwashing said bed, said materials differing in grain size and specific gravity, but possessing equal hydraulic uplift properties when subject to backwash, the proportions of said two component materials varying continuously throughout the depth of the bed according to their respective grain sizes, the proportion of the component having the larger grain size decreasing in the direction of flow of liquid through said bed.

2. A granular bed as in claim 1 in which said component materials differ also in shape.

3. The granular filter bed of claim 1 in which the larger grained said material being 100% by volume in relative proportion at the top of said bed and decreasing in percentage of composition by volume with depth to 0% at the bottom of said bed, the smaller grained said material being 0% by volume in relative proportion at the top of said bed and increasing in percentage of composition by volume with depth to 100% at the bottom of said bed, passing of liquid during filtration being in the downflow direction.

4. The granular filter bed of claim 3 in which a top cover of said larger grained material overlays the layer of said blended materials.

5. The granular filter bed of claim 3 in which a bottom layer of said smaller grained material underlies the layer of said blended materials.

6. The granular filter bed of claim 3 in which the bed is underlain by a lower blended layer which consists of said smaller grained material and a still smaller grained material, said lower blended layer varying reversedly in average grain size with depth, said still smaller grained material possessing equal hydraulic uplift properties as said other said component materials when subject to backwash.

7. The granular filter bed of claim 6 in which the bed is overlain by a layer of said larger grained material.

8. The granular filter bed of claim 6 in which said lower blended layer is underlain by a layer of said still smaller grained material.

9. A granular filter bed as in claim 1 in which a layer of the larger grain size component is at the bottom of the bed and the flow of liquid is upward.

10. The granular filter bed of claim 1 in which a layer of the smaller grain size component is at the top of the bed and the flow of liquid is upward.

11. The granular filter bed of claim 10 in which the relative distribution of said larger grained and said smaller grained materials vary linearly with depth within said bed.

12. The granular filter bed of claim 10 in which the relative distribution of said larger grained and said smaller grained materials vary curvilinearly with depth within said bed.

13. The granular filter bed of claim 1 in which the average grain size of the blend of said component materials decreases in the direction of flow of liquid through said bed.

14. The granular filter bed of claim 1, the larger grained material being 100% by volume in relative proportion at the bottom of said bed and decreasing in percentage of composition by volume with height to 0% at the top of said bed, the smaller grained material being 0% in relative proportion at the bottom of said bed and increasing in percentage of composition by volume with height to 100% at the top of said bed, said bed being overlain by an upper blended layer which consists of said smaller grained material and a still smaller grained material, said upper blend varying reversedly in average grain size with height, said still smaller grained material being 100% in relative proportion at the top of said upper blended layer, said still smaller grained material possessing equal hydraulic uplift properties as said other component materials when subject to backwash, passage of liquid during filtration being in the upflow direction.

References Cited

UNITED STATES PATENTS 3,343,680   9/1967   Rice et al. _____ 210—263

SAMIH N. ZAHARNA, Primary Examiner

U.S. Cl. X.R.

210—290